(12) United States Patent
Harris et al.

(10) Patent No.: US 8,214,253 B1
(45) Date of Patent: Jul. 3, 2012

(54) IDENTIFYING INFLUENCERS AMONG A GROUP OF WIRELESS-SUBSCRIPTION SUBSCRIBERS

(75) Inventors: David Lindel Harris, Pleasanton, CA (US); Claudio Ribeiro Lima, San Jose, CA (US); James Dale Black, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 521 days.

(21) Appl. No.: 12/389,470

(22) Filed: Feb. 20, 2009

(51) Int. Cl.
*G06Q 30/02* (2012.01)
(52) U.S. Cl. ............. 705/14.1; 705/7.29; 705/7.33; 455/3.04; 455/461
(58) Field of Classification Search ............ 705/14.1, 705/7.29, 7.33; 455/3.04, 461
See application file for complete search history.

(56) References Cited

U.S. PATENT DOCUMENTS

| | | | | |
|---|---|---|---|---|
| 6,597,903 B1 * | 7/2003 | Dahm et al. | ............. | 455/405 |
| 2003/0200135 A1 * | 10/2003 | Wright | ............. | 705/10 |
| 2008/0096594 A1 * | 4/2008 | Vinding | ............. | 455/466 |
| 2009/0063254 A1 * | 3/2009 | Paul et al. | ............. | 705/10 |
| 2009/0190729 A1 * | 7/2009 | Chakraborty et al. | ... | 379/112.01 |

OTHER PUBLICATIONS

Predicting Calls—New Service for an Intelligent Phone, Phithakkitnukoon, Santi; Dantu, Ram, Lecture Notes in Computer Science, 2007, vol. 4787/2007, p. 26-37.*

\* cited by examiner

*Primary Examiner* — Ramsey Refai
*Assistant Examiner* — Milena Racic

(57) ABSTRACT

An embodiment of the current invention is directed to retaining customers for a wireless-service provider ("carrier"). A plurality of users who are influencers are identified from a group of wireless-service subscribers, wherein an influencer is a user who is likely to affect decisions of other users regarding whether to cancel or maintain their subscriptions with a particular carrier based on whether the influencer cancels or maintains his or her subscription. A list of influencers is thereby created. An incentive to provide the list of identified influencers is determined. The incentive increases the likelihood that the set of influencers will retain their respective subscriptions, thereby increasing the likelihood that other subscribers who might be influenced will also retain their respective subscriptions.

17 Claims, 6 Drawing Sheets

IDENTIFYING INFLUENCERS AMONG A GROUP OF WIRELESS-SUBSCRIPTION SUBSCRIBERS

SUMMARY

Embodiments of the invention are defined by the claims below, not this summary. A high-level overview of various aspects of the invention is provided here for that reason, to provide an overview of the disclosure and to introduce a selection of concepts that are further described below. This summary is not intended to identify key features or essential features of the claimed subject matter, nor is it intended to be used as an aid in isolation to determine the scope of the claimed subject matter.

Embodiments of the present invention are related to retaining customers for a wireless-service provider ("carrier"). A plurality of users who are influencers are identified from a group of wireless-service subscribers, wherein an influencer is a user who is likely to affect decisions of other users regarding whether to cancel or maintain their subscriptions with a particular carrier based on whether the influencer cancels or maintains his or her subscription. The identification is accomplished by a process that includes: determining an incoming-call count by counting the number of incoming calls received by a particular subscriber; determining an outgoing-call count by counting the number of calls originating from the particular subscriber; calculating a ratio based on the incoming-call count and the outgoing-call count; comparing the ratio to an influencer threshold; and indicating that the subscriber is an influencer when the ratio is greater than the influencer threshold. A list of influencers is thereby created. An incentive to provide the list of identified influencers is determined. The incentive increases the likelihood that the set of influencers will retain their respective subscriptions, thereby increasing the likelihood that other subscribers who might be influenced will also retain their respective subscriptions.

BRIEF DESCRIPTION OF THE DRAWINGS

Illustrative embodiments of the present invention are described in detail below with reference to the attached drawing figures, and wherein.

DETAILED DESCRIPTION

Figure 1:
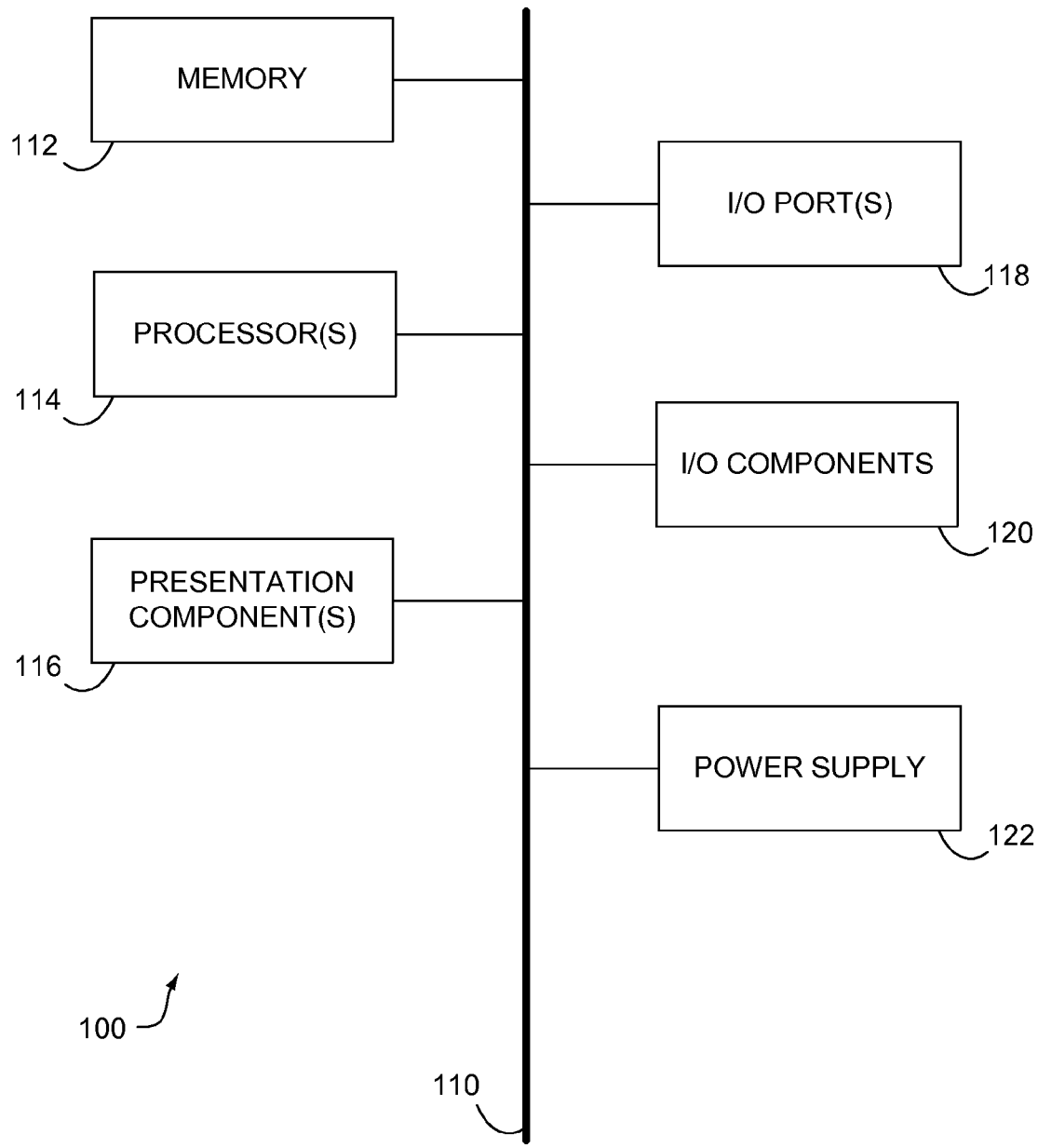
FIG. 1 depicts a block diagram of an exemplary computing environment suitable for implementing an embodiment of the invention.

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention are directed to, among other things, a method of identifying wireless-service subscribers ("subscribers") that are likely to leave a particular service provider or carrier that is providing the wireless services that the subscribers are using. Churners are subscribers that leave their wireless-service provider. Subscribers can be called wireless-service users and typically have a mobile computing device associated with them, which they use to access the services to which they subscribe.

Subscribers that churn may cause other subscribers to churn. Social connections between subscribers could increase the likelihood that the subscribers could churn together. These social relationships between subscribers could be characterized in terms of data derived from logs of activity for a particular subscriber's mobile computing device in a number of ways. For example, the number of calls a subscriber receives from a second subscribers could indicate the strength of a social relationship between the two.

According to an embodiment of the invention, influencers are subscribers who have potentially strong social bonds over many other subscribers. For example, a parent with a number of children would have strong influence over the choice of a wireless-service provider for the entire family. If the parent churns, the rest of the family will, with high probability, churn. Those subscribers with many unique subscribers calling them may also have influence over a large number of users. For example, many service providers offer incentives for all members of groups of friends to utilize the same service provider, by offering free mobile-to-mobile calling between mobile computing devices using the same service provider. If a single subscriber with a large group of other subscribers as friends could be prevented from churning, it is possible that the entire social group so defined could be maintained at the service provider.

A number of metrics could be used to identify influencers. For example, a ratio of the number of calls received to the number of calls initiated (i.e., incoming to outgoing calls) could be used to identify influencers. Subscribers that have a large number of other subscribers calling them are likely to have a large range of influence. Additionally, other data transfers could be used to identify influencers. For example, email messages, text messages, instant messages, and picture/multimedia messages could be used to identify influencers. Average call length could also be used to identify an influencer. For example, a subscriber with a large amount of incoming calls, all of which are short, could be a strong influencer, or an influencer with a large number of other subscribers who are under their influence. In this case, it could be said that the influence of the subscriber is inversely proportional to the average call length. As a further factor, geographic proximity of the subscriber with the other subscribers could be a factor. If the subscriber in question is geographically near to all the various other subscribers that make up the incoming calls, that subscriber may be said to be a strong influencer. Finally, if a subscriber has connections with many other subscribers who themselves are influencers, this may indicate that they are a strong influencer.

According to an embodiment of the invention, a metric could be created, based on some combination of the metrics previously described. This metric could be evaluated for each of the subscribers of a particular wireless-service provider. A threshold could be set, wherein any subscriber with a metric that evaluates to higher than the threshold could be labeled an influencer. These influencers could then be targeted with incentives. Incentives could be any mechanism by which a service provider attempts to convince a subscriber not to churn. By way of example, an incentive could be an offer for a discount on a new mobile computing device. As another example, an incentive could be an offer of an amount of free service. As a further example, an incentive could involve passing the subscribers information to a marketing department or a retention department to provide some further incentive.

An embodiment of the invention is directed to retaining customers for a wireless-service provider ("carrier"). A plurality of users who are influencers are identified from a group of wireless-service subscribers, wherein an influencer is a user who is likely to affect decisions of other users regarding whether to cancel or maintain their subscriptions with a particular carrier based on whether the influencer cancels or maintains his or her subscription. The identification is accomplished by a process that includes: determining an incoming-call count by counting the number of incoming calls received by a particular subscriber; determining an outgoing-call count by counting the number of calls originating from the particular subscriber; calculating a ratio based on the incoming-call count and the outgoing-call count; comparing the ratio to an influencer threshold; and indicating that the subscriber is an influencer when the ratio is greater than the influencer threshold. A list of influencers is thereby created. An incentive to provide the list of identified influencers is determined. The incentive increases the likelihood that the set of influencers will retain their respective subscriptions, thereby increasing the likelihood that other subscribers who might be influenced will also retain their respective subscriptions.

Another embodiment of the invention is directed to retaining customers of a wireless-service provider. A group of wireless-service subscribers ("subscribers") that are influencers are identified by a particular process. The process includes: identifying a plurality of subscribers; calculating a ratio of incoming connections to outgoing connections for each of the subscribers; comparing the ratio for each of the plurality of subscribers to an influencer threshold; and determining a list of influencers, the list containing the subscribers with ratios greater than the influencer threshold. One or more incentives are determined to increase the likelihood that the influencers will not churn.

A further embodiment of the invention is directed to retaining customers of a wireless-service provider. A list of influencers is determined from a group of subscribers. The list of influencers is determined by a process including: determining a number of incoming connections, including calls, text messages, and picture messages; determining an number of outgoing connections, including calls, text messages, and picture messages; calculating a ratio of incoming connections to outgoing connections, the ratio including a factor based on the average length of calls; comparing the ratio to an influencer threshold; and generating a set of influencers, the set including those subscribers with ratios greater than the influencer threshold. The set of influencers is presented. The presentation could, for example, be on a printed sheet to a marketing division of the wireless-service provider.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and include both volatile and nonvolatile media, removable and nonremovable media. By way of example, and not limitation, computer-readable media may include computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, Random-Access Memory (RAM), Read-Only Memory (ROM), Electrically-Erasable, Programmable, Read-Only Memory (EEPROM), flash memory or other memory technology, Compact Disk, Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. Memory 112 includes computer-storage media in the form of nonvolatile memory. The memory 112 may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. I/O components 120 present data indications to a user or other device. Exemplary output components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
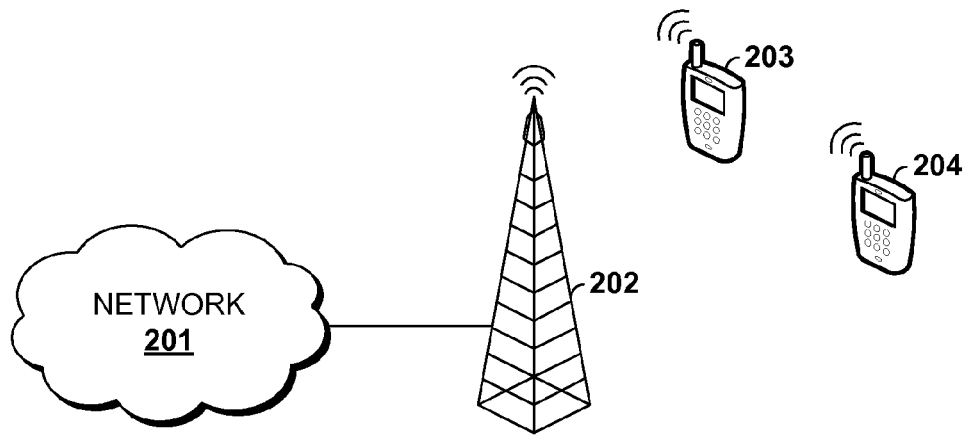
FIG. 2 depicts a block diagram of an exemplary network environment suitable for implementing an embodiment of the invention.

Turning now to FIG. 2, a diagram depicting a network environment suitable for implementing the present invention is given. A base station 202 provides a point of connection to a network 201 for a number of mobile computing devices 203, 204. Such mobile computing devices 203, 204 can be any computing device with the ability to connect to the network via a base station 202. For example, many personal digital assistants (PDAs), mobile phones, and laptop computers have wireless networking interfaces through which they can connect to a base station 202.

There are a number of possible wireless technologies suitable for connecting a mobile computing device, such as mobile computing devices 203 and 204, to a base station 202. By way of example, third-generation cellular technologies, such as Code Division Multiple Access-EVolution Data/Voice (CDMA-EVDO) could be used to connect a mobile device 203 to a base station 202. IEEE 802.11 wireless links could also be used to connect a mobile computing device 203 to a base station 202.

Base station 202 can provide a point of connection to a network 201 via a wired or a wireless link, which may be called a backhaul link. The network 201 could be a private intranet, or a wide-area network such as the Internet. Other computing devices connected to the network 201 can communicate with a mobile computing device 203 connected to the network 201 via a base station 202 by way of the base station 202.

Figure 3:
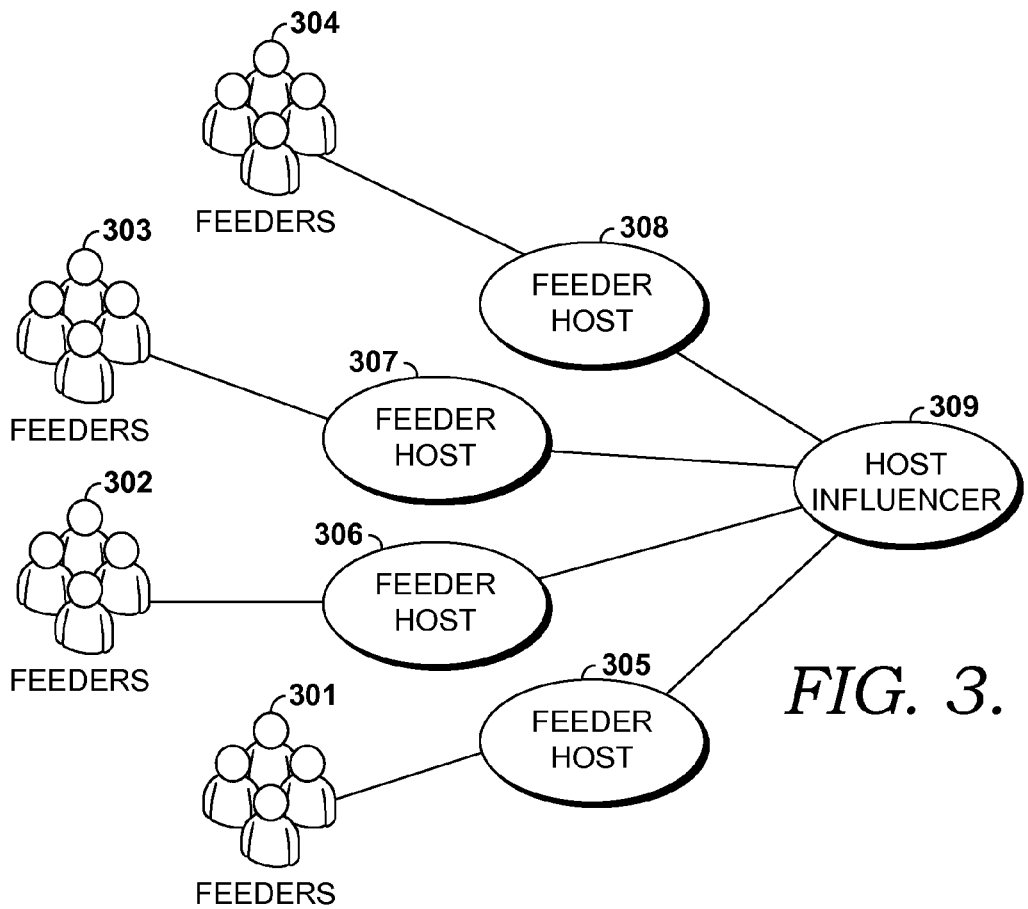
FIG. 3 depicts a block diagram of an exemplary social network of subscribers, in accordance with an embodiment of the invention.

Referring to FIG. 3, a social diagram of wireless-service subscribers is given. Users can attach their mobile computing devices to a network through the use of a group of base stations provided by a network-service provider, or carrier. Such network-service providers may charge a fee for users to utilize base stations for access to the network. These users are subscribers, subscribing to the network-access service provided by the network-service providers.

Some subscribers could have influence over other subscribers with respect to decisions on whether to maintain a subscription to a particular wireless-service provider or to cancel that subscription. Subscribers that influence more than some fixed number of other subscribers could be considered influencers 309. Subscribers that are influenced by others can be called feeders 301, 302, 303, 304. Feeders may have limited or no influence on other subscribers. By way of example, in a single family, the parents may be considered influencers 309 and the children may be considered feeders 301, 302, 303, 304.

In addition to feeders 301, 302, 303, 304, and influencers 309, there can be a number of influencers who are themselves feeders to some other subscriber, called feeder hosts 305, 306, 307, 308. By way of the family example, the influencer 309 could be a grandparent, the feeder hosts 305, 306, 307, 308 could be the parents, who are children of the grandparent, and the feeders 301, 302, 303, 304 could be the children. In this case, the children would be likely to use the wireless-service provider of the parents, and the parents would be likely to use the wireless-service provider of the grandparent.

If a wireless-service provider could identify such influencers 309, and target them with incentives, the wireless-service provider could potentially increase the likelihood that a large amount of subscribers will not cancel their subscription (i.e., will not churn) using only a single incentive to a single subscriber.

Figure 4:
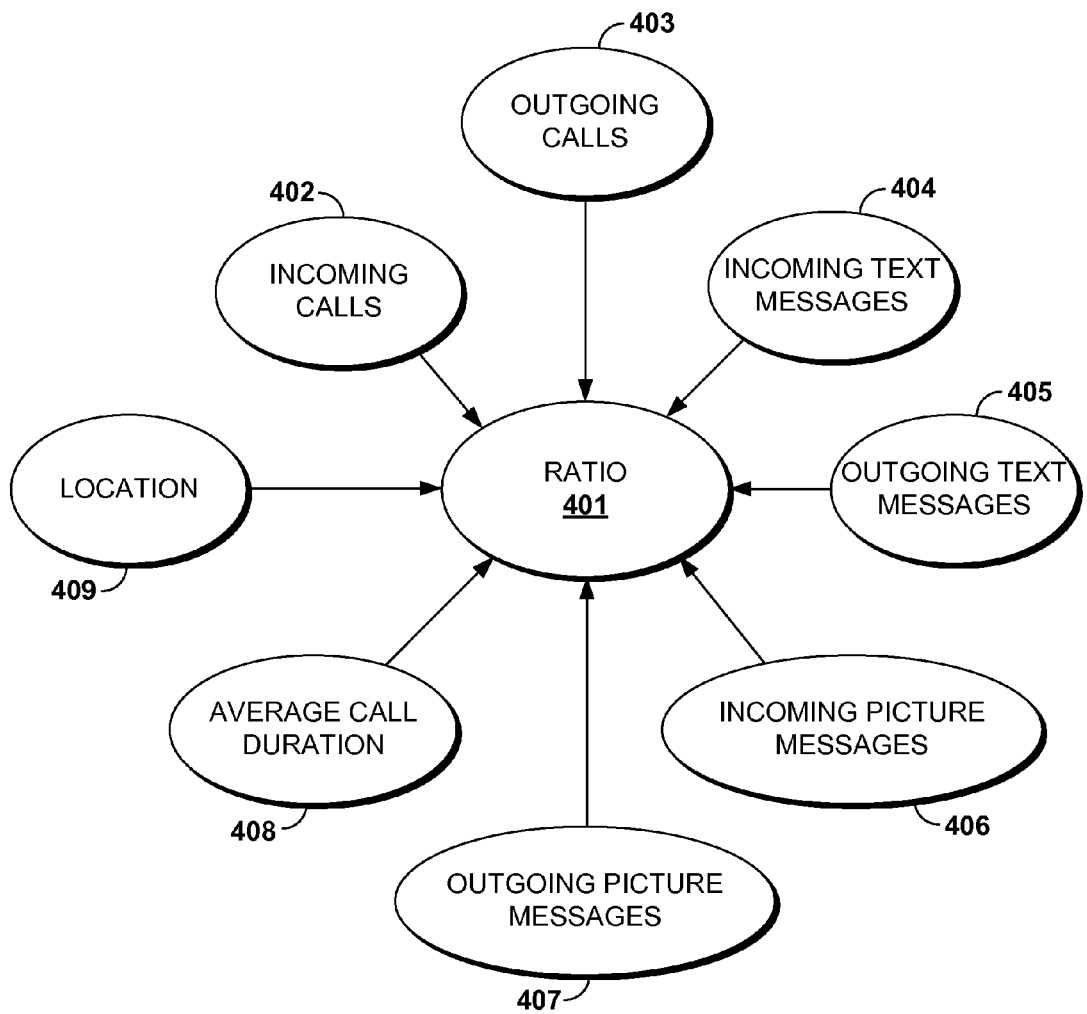
FIG. 4 depicts a block diagram of factors that can contribute to an influencer ratio, in accordance with an embodiment of the invention.

Turning now to FIG. 4, a number of metrics can be used to identify a subscriber as an influencer. In order to identify a subscriber as an influencer, a number of statistics about that subscriber's communication patterns can be collected and combined into a metric. By way of example, an influencer could be defined as any subscriber with a ratio 401 of incoming calls 402 to outgoing calls 403 that is greater than some threshold. Such a threshold could be called an influencer threshold and could be chosen experimentally. If the influencer threshold is set to a large number, then it is likely that the influencers thereby identified will be likely to, in fact, influence other nodes; however, some influencers may not be identified. If the influencer threshold is set to a low number, then more subscribers will be identified as influencers; however, some of the identified influencers may in fact have no influence on other subscribers.

A number of factors or metrics can be included in such a ratio 401 and such an influencer threshold. For example, the number of incoming text messages 404 and the number of outgoing text messages 405 could be included in the ratio 401. The number of incoming picture and multimedia messages 406 and the number of outgoing picture and multimedia message 407 could be included in the ratio 401. Many mobile computing devices have the ability to transfer various multimedia files in message form, including picture messages, video messages, audio messages, and various combinations, all of which can be broadly considered multimedia messages.

The average call duration 408 could be considered as a factor in determining the ratio 401. By way of example, the ratio could be defined as inversely proportional to the average call duration. Many short, incoming calls could be an indication that a subscriber has a wider range of influence than a subscriber with fewer, long calls. Location 409 could also be a factor in determining the ratio 401. For example, if a subscriber has many incoming calls, but all of them are from subscribers from a different region, they may be less likely to influence those subscribers.

In addition to metrics having to do with call statistics of a particular subscriber, statistics related to the subscribers connected to the subscriber for whom the ratio is being calculated could be used. For example, if all of the incoming calls to a particular subscriber are from subscribers who are themselves influencers, this may indicate that the subscriber is an influencer.

Figure 5:
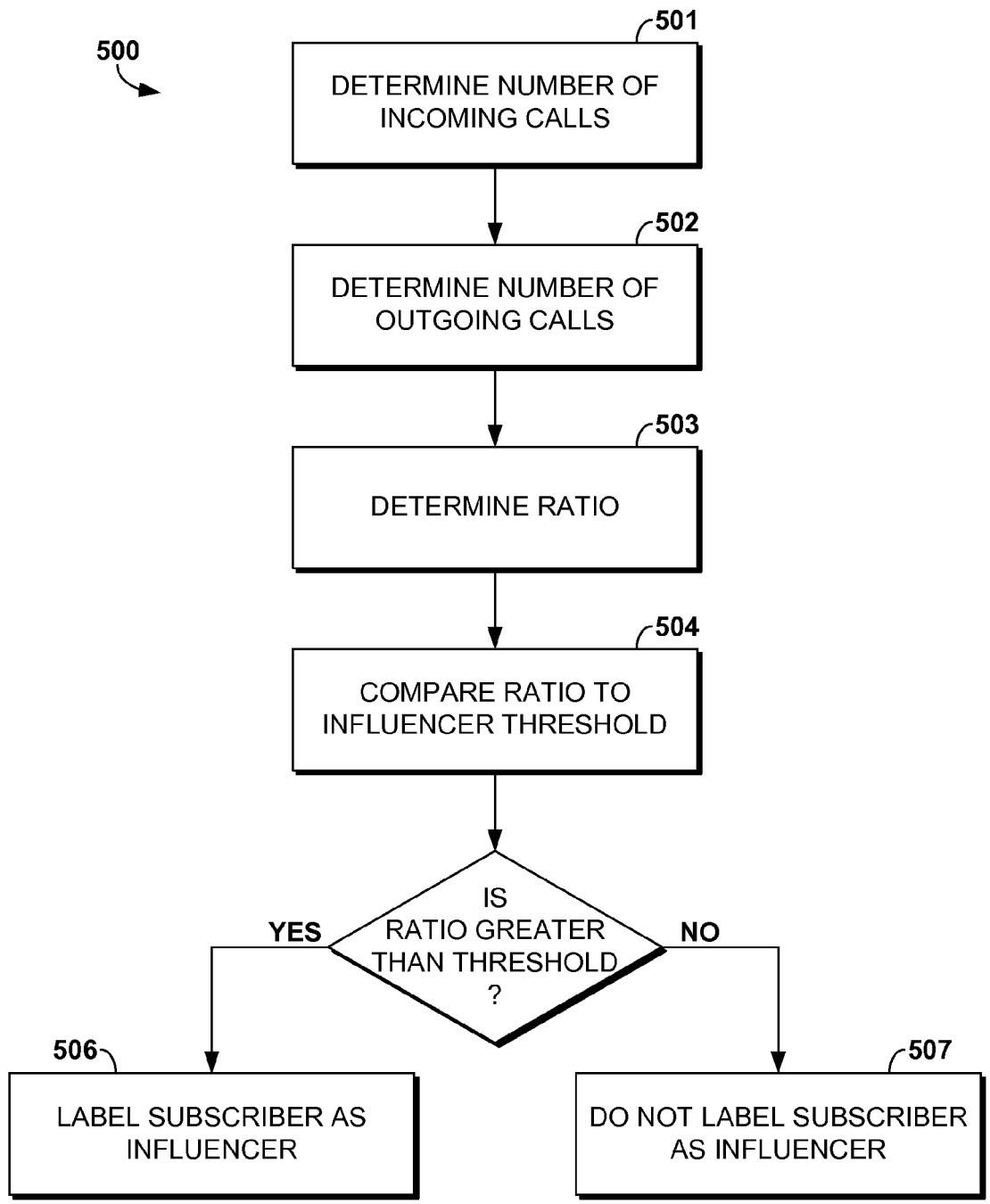
FIG. 5 is a flow diagram showing a method of determining an influencer, in accordance with an embodiment of the invention.

Turning now to FIG. 5, a flow diagram depicting a method 500 of determining a subscriber is an influencer is given. A number of incoming calls is determined, as shown at block 501 and a number of outgoing calls is determined, as shown at block 502. The number of incoming calls and the number of outgoing calls could be counted from a call log associated with a particular subscriber. These counts could be performed using a number of different lengths of call logs. By way of example, a monthly call log could be used to determine the number of incoming calls and the number of outgoing calls. As another example, a quarterly log could be used to determine the number of incoming calls and the number of outgoing calls for a particular subscriber.

A ratio is determined for the subscriber, as shown at block 503. As discussed with respect to FIG. 4, a number of factors could be used in determining the ratio. By way of example, the incoming and outgoing call counts could be used. Additionally, the average call length and location of callers could be used in determining the ratio. Many other metrics could be used in calculating the metric. The ratio can be compared to an influencer threshold, as shown at block 504. The influencer threshold could be determined experimentally. The influencer threshold could also be determined through the use of a model, which models the behavior of subscribers who churn based on a number of metrics such as those described with respect to FIG. 4. If the ratio is greater than the influencer threshold, then the subscriber is labeled an influencer, as shown at block 506. If the ratio is not greater than the influencer threshold, then the subscriber is not labeled an influencer, as shown at block 507.

Figure 6:
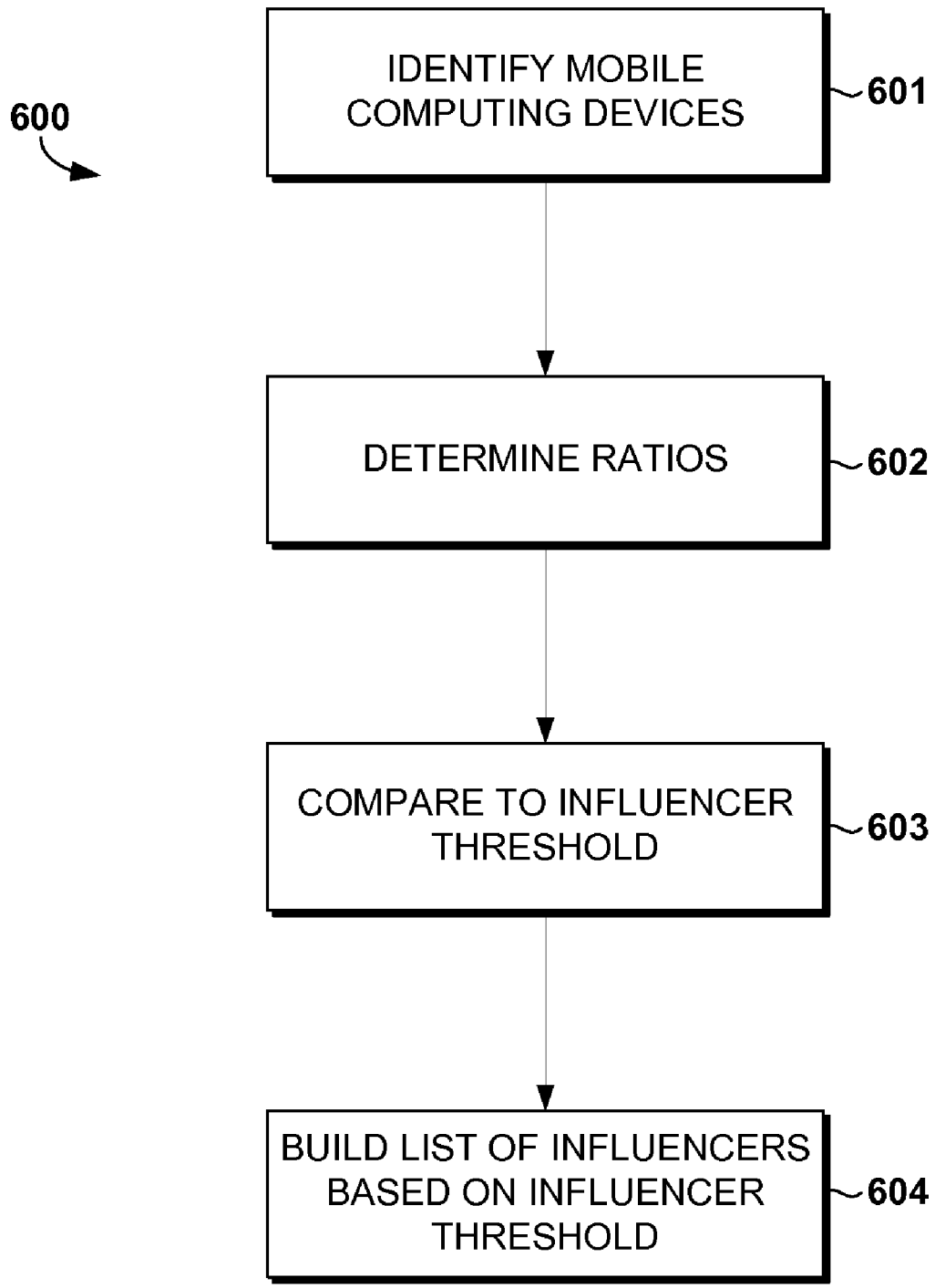
FIG. 6 is a flow diagram showing a method of determining an influencer, in accordance with an embodiment of the invention.

Turning now to FIG. 6, a flow diagram depicting a method 600 of determining a mobile computing device is an influencer is given. A number of mobile computing devices are identified, each associated with a subscriber, as shown at block 601. The group of mobile computing devices could be the group of all mobile computing devices within a particular service area serviced by a particular wireless-service provider. The identification of mobile computing devices associated with subscribers can facilitate the acquisition of data used to calculate ratios for each subscriber. For example, call logs could be associated with particular mobile computing devices.

A ratio is determined for each of the subscribers associated with each of the mobile computing devices, as shown at block 602. These ratios could include a number of different metrics, such as those discussed with respect to FIG. 4. The ratios are compared to an influencer threshold, as shown at block 603. A list of influencers can be built based on the comparison of the ratios related to each subscriber and the influencer threshold, as shown at block 604. For example, any subscriber with a ratio greater than the influencer threshold could be added to the list of influencers.

Figure 7:
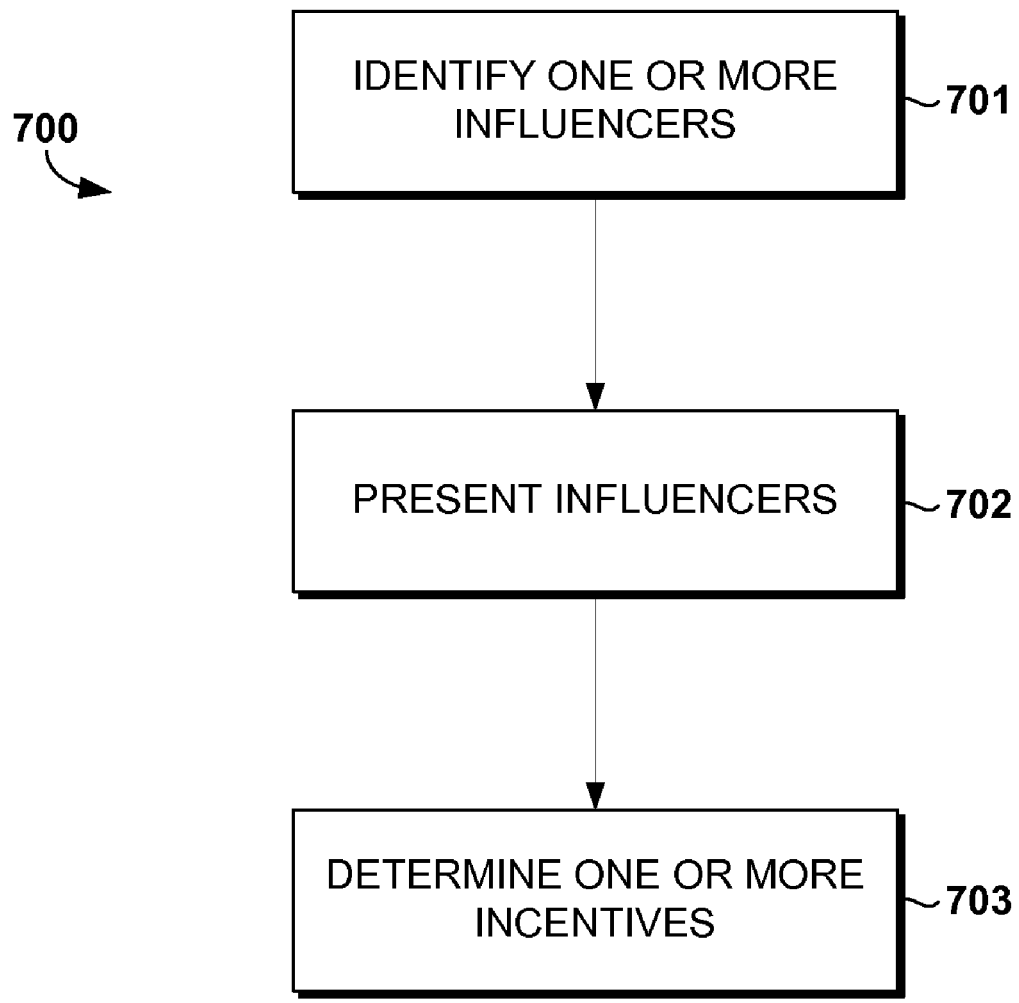
FIG. 7 is a flow diagram showing a method of retaining customers, in accordance with an embodiment of the invention.

Turning now to FIG. 7, a flow diagram depicting a method 700 of retaining customers is given. One or more influencers are identified, as shown at block 701. The methods depicted in FIG. 5 and FIG. 6 are examples of suitable methods for identifying influencers. The influencers are presented, as shown at block 702. By way of example, the influencers could be presented to a marketing department. As another example, the influencers could be presented via a printed medium. One or more incentives are determined to increase the likelihood that the influencers that have been determined in block 701 will maintain their subscriptions with the wireless-service provider, as shown at block 703. Such incentives could be in the form of free services. Another example of an incentive could be the offer of a new mobile computing device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed by a computing device, facilitate a method of retaining customers of a carrier, the method comprising:
   by way of said computing device, identifying from among a group of wireless-service subscribers ("subscribers") a plurality of users who are influencers,
   wherein each of said subscribers subscribes to wireless services offered by the carrier,
   wherein an influencer is a subscriber who potentially affects decisions of other subscribers regarding whether to cancel or maintain their subscriptions with said carrier, wherein said decisions of the other subscribers are based on whether said influencer cancels or maintains his or her subscription,
   wherein said identifying is accomplished by a process that includes, for each subscriber in said group,
      (A) determining an incoming-call count by counting a number of incoming calls that were received by a given mobile device associated with a given subscriber,
      (B) determining an outgoing-call count by counting a number of calls originating from the given mobile device,
      (C) calculating a ratio based on said incoming-call count and said outgoing-call count,
      (D) comparing the ratio to an influencer threshold, and
      (E) indicating that the given subscriber of said given mobile device is an influencer when said ratio is greater than the influencer threshold, thereby generating a set of identified influencers; and
   determining an incentive to provide to said set of identified influencers, thereby, when said incentive is provided, increasing a likelihood that said set of identified influencers will retain their respective subscriptions, and thereby increasing a likelihood that other subscribers who might be influenced will also retain their respective subscriptions.

2. The nontransitory computer-readable media of claim 1, wherein determining an incoming-call count includes determining an incoming-call count from a monthly call log.

3. The nontransitory computer-readable media of claim 1, wherein determining an outgoing-call count includes determining an outgoing-call count from a call log.

4. The nontransitory computer-readable media of claim 1, wherein calculating the ratio comprises including in the ratio a number of incoming text messages and a number of outgoing text messages.

5. The nontransitory computer-readable media of claim 1, wherein calculating the ratio comprises including in the ratio a number of incoming picture messages and a number of outgoing picture messages.

6. The nontransitory computer-readable media of claim 1, wherein calculating the ratio comprises including a factor based on an average call length.

7. The nontransitory computer-readable media of claim 6, wherein the factor based on the average call length is inversely proportional to the average call length.

8. The nontransitory computer-readable media of claim 1, wherein calculating the ratio comprises including a factor based on location information.

9. The nontransitory computer-readable media of claim 1, wherein calculating the ratio comprises including a factor based on an outgoing-call count to mobile computing devices of subscribers labeled as influencers and an incoming-call count from mobile computing devices of subscribers labeled as influencers.

10. The nontransitory computer-readable media of claim 1, wherein labeling the given subscriber an influencer includes labeling the given subscriber an influencer in a list of subscribers.

11. One or more nontransitory computer-readable media having computer-executable instructions embodied thereon that, when executed by a computing device, facilitate a method of retaining customers, the method comprising:
   identifying a group of wireless-service subscribers ("subscribers") who are influencers, wherein each of said subscribers subscribes to wireless services offered by a carrier, and wherein an influencer is a subscriber whose cancellation of wireless services potentially causes other subscribers to cancel their subscriptions with said carrier, wherein said identifying is accomplished by a process that includes,
      (A) identifying a plurality of subscribers,
      (B) calculating a ratio of incoming connections to outgoing connections for each of the plurality of subscribers, wherein the ratio is also based on an average call duration, and wherein the ratio is inversely proportional to the average call duration,
      (C) comparing the ratio for each of the plurality of subscribers to an influencer threshold, and
      (D) determining a list of influencers, the list containing subscribers with ratios greater than the influencer threshold; and
   determining one or more incentives to provide to one or more subscribers on the list of influencers, thereby increasing a likelihood that said one or more subscribers will retain their respective subscriptions.

12. The nontransitory computer-readable media of claim 11, wherein identifying a plurality of subscribers includes identifying a plurality of mobile computing devices associated with said subscribers from a device log.

13. The nontransitory computer-readable media of claim 11, wherein the incoming connections for each subscriber include a plurality of calls to a subscriber, a plurality of text messages sent to the subscriber, and a plurality of picture messages sent to the subscriber.

14. The nontransitory computer-readable media of claim 11, wherein determining a ratio of incoming calls to outgoing calls comprises including a factor based on location information.

15. The nontransitory computer-readable media of claim 11, wherein calculating the ratio comprises including a factor based on the number of outgoing connections to subscribers labeled influencers and the number of incoming connections from subscribers labeled influencers.

16. One or more nontransitory computer-readable media having computer-executable instructions embodied thereon that, when executed by a computing device, facilitate a method of retaining customers, the method comprising:
   by way of said computing device, identifying from among a group of wireless-service subscribers ("subscribers") a plurality of users who are influencers,
   wherein each of said subscribers subscribes to wireless services offered by a carrier, and wherein an influencer is a user who potentially affects decisions of other users regarding whether to cancel or maintain their subscriptions with said carrier, wherein said decisions of other users are based on whether said influencer cancels or maintains his or her subscription,
   wherein said identifying is accomplished by a process that includes, for each subscriber in said group,
      (A) determining a number of incoming connections for the subscriber, the incoming connections including a plurality of calls, a plurality of text messages, and a plurality of picture messages,
      (B) determining a number of outgoing connections for the subscriber as a number of outgoing calls, the connections originating for the mobile device including a plurality of calls, a plurality of text messages, and a plurality of picture messages,
      (C) calculating a ratio of incoming connections to outgoing connections, the ratio including a factor inversely proportional to an average length of calls;
      (D) comparing the ratio to an influencer threshold,
      (E) indicating that a given subscriber is an influencer when said ratio is greater than the influencer threshold, thereby generating a set of identified influencers to be targeted by incentives to retain subscribes identified as influencers; and
   presenting said set of identified influencers on a presentation device that is coupled to said computing device.

17. The nontransitory computer-readable media of claim 16, wherein presenting said set of identified influencers includes displaying the set of identified influencers on a display device attached to the computing device.

* * * * *